Aug. 24, 1926.

Re. 16,410

R. C. WOOLMAN

ARTWORK DESK

Original Filed Feb. 13. 1923

Witness:
Jas. B. Hutchinson.

Inventor:
Roy C. Woolman,
By Hill & Hill
Attorneys.

Reissued Aug. 24, 1926. Re. 16,410

UNITED STATES PATENT OFFICE.

ROY C. WOOLMAN, OF DES MOINES, IOWA, ASSIGNOR, BY DIRECT AND MESNE ASSIGNMENTS, TO KEWAUNEE MANUFACTURING COMPANY, OF KEWAUNEE, WISCONSIN, A CORPORATION OF WISCONSIN.

ARTWORK DESK.

Original No. 1,477,409, dated December 11, 1923, Serial No. 618,872, filed February 13, 1923. Application for reissue filed April 28, 1925. Serial No. 26,522.

The object of my invention is to provide an art work desk, particularly suitable for work in schools of very simple, inexpensive and efficient construction.

More particularly, it is my object to provide an art work desk, so constructed and arranged that it may be readily and easily adapted for a variety of uses, permitting as occasion arises the so-called fine art work such as drawing with ink, pencil or charcoal, and painting, this work requiring the use of light instruments and materials such as brushes, pencils, compass, paper, cloth and paints, and also making possible various industrial art processes requiring the use of heavier tools and materials such as hammers, saws, chisels, planes, wood, metal, clay and leather. This great variety of uses makes possible an essential elaboration and proper combination of related fine and industrial arts, thus avoiding what has been hitherto a serious disadvantage to this work in schools, particularly elementary schools, where the teaching of fine arts on the one hand has been confined to rooms furnished with equipment designed primarily for the purpose of containing books and entirely separate on the other hand from industrial arts usually called manual training, which consisted largely of woodwork and made use of equipment and materials designed for this purpose.

My art work desk will bring together all of these related processes and will eliminate from schools a disadvantageous and expensive duplication of equipment, teaching skill and schoolroom space.

Another object is to provide such a device, which can be used for general purposes and which has as a part thereof an adjustable easel so constructed and arranged and mounted on the desk that it may be used in cooperation with the desk for drawing or be entirely put out of the way, so as not to interfere with the use of the desk, and also to be used as a support for the back of the child in front.

With these and other objects in view, my invention consists in the construction, arrangement and combination of the various parts of my art work desk, whereby the objects contemplated are attained, as hereinafter more fully set forth, pointed out in my claims, and illustrated in the accompanying drawings, in which:

Figure 1:
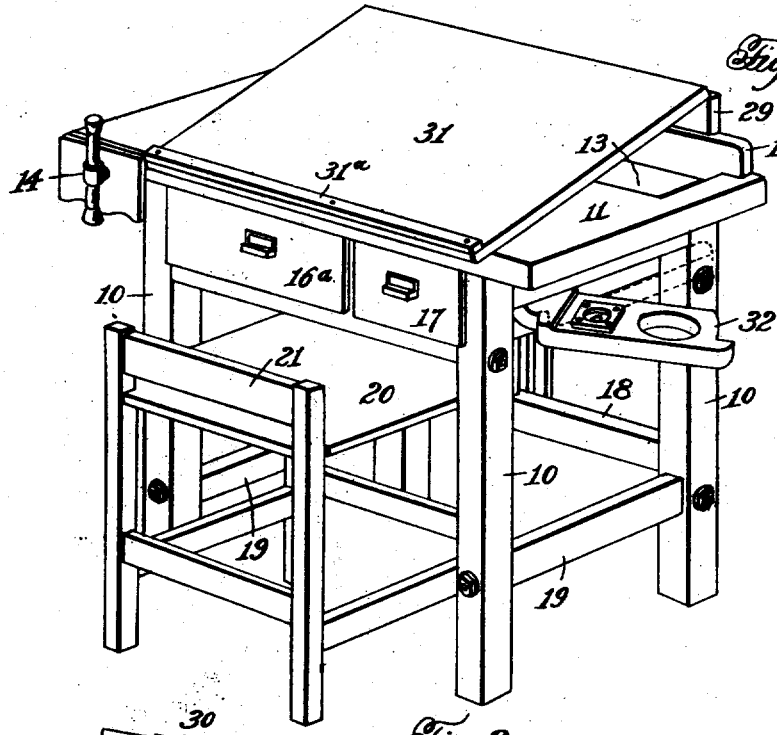
Figure 1 shows a perspective view of an art work desk embodying my invention.

In the accompanying drawings, I have used the reference numeral 10 to indicate the legs of the desk, which are four in number.

Supported on the legs 10 is a top 11 at the back of which is a member 12 extending upwardly above the top for a short distance. In the top 11 near the back 12 is a depression or trough 13 for receiving tools or instruments or the like.

Arranged at one end of the top 11 near the front thereof is a wood vise 14 below which is a cross bar 15 on which are pins or the like 16 for hanging tools.

Under the top 11 are slidably mounted two drawers 16[a] and 17 to receive tools, brushes, instruments, books and materials.

The two rear legs 10 are connected by a cross member 18 and the respective legs at each end of the art work desk are connected by brace members 19.

The space between the two front legs below the drawers 16[a] and 17, is left open to receive a special chair 20 with a low back 21, which chair can be slid under the desk.

Mounted for vertical, sliding movement in a groove 22 in the member 12 is an upright member 23, having a longitudinally elongated slot 24 therein. A bolt 25, having adjacent to its head, a washer 26, is extended through the slot 24 and through the member 12, and has on its forward end a washer 27 and a wing nut 28.

Fixed to the upper end of the upright 23 is a cross member 29. Hinged to the upper surface of the cross member 29 by means of double acting hinges 30 is one edge of a drawing board 31, which together with the desk proper can be adjusted, so as to form an easel. The board 31 has on its upper side at the free edge, a strip 31[a]. On the lower end of the upright 23 is a resilient button 23[a] against which the strip 31[a] will rest when the board is swung to position where it hangs in the rear of the desk. These parts are so arranged that the board 31 is properly inclined to form a back rest for the pupil, as mentioned later herein.

Pivotally supported beneath the top is a small shelf 32 for holding an ink-well and water bottle or the like. This shelf is adapted to be swung into its position shown by dotted lines in Figure 1 or to its position shown by full lines, where the ink bottle or the like are accessible.

When the art work desk is being used for other purposes than for drawing or for any purpose where the board 31 is not to be used, that board, is swung over to position where it hangs adjacent to the back of the desk.

These desks are designed for use in the public schools and are then arranged in rows.

If the instructor is talking to the pupils for any considerable length of time, the board 31 can be used as a back for the pupil in front. This is of some importance because the chair 20 has only a low back 21, in order that the chair may be shoved under the desk, so that the desk and chair may occupy a minimum of floor space, when not in use.

The use of the low back has the disadvantage that when the pupils have to sit for some time listening to the instructor, the low back 21 is not sufficient. However, when the desks are arranged in rows, the pupil in front of the desk under consideration can push his chair back a short distance and use the board 31 of the desk behind him for a back. The board furnishes a smooth surface, and its use for a back does not interfere with the pupil behind.

Figure 2:
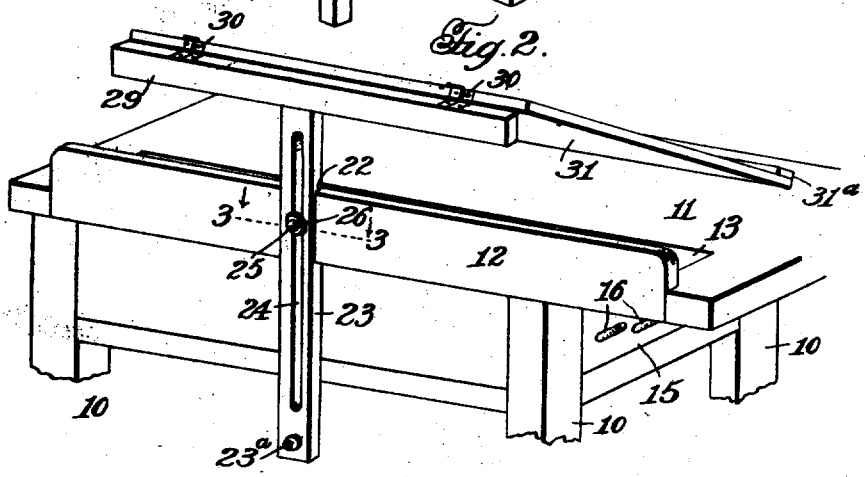
Figure 2 shows a perspective view of a portion of the desk, as seen from the rear.
Figure 3:
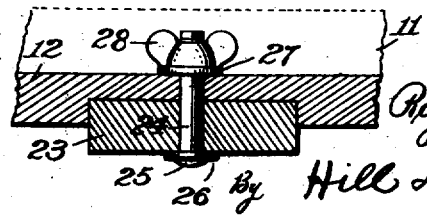
Figure 3 shows a detailed, sectional view taken on the line 3—3 of Figure 1.

When it is desired to use the board 31 in connection with the desk as an easel, the board is swung over from its position hanging down behind the desk to its position shown in full lines in Figure 2 or Figure 1, where the top 11 supports the forward portion of the board and the member 23 supports the back part of the board.

By adjusting the wing nut 28, the member 23 may be loosened, so that it may be raised or lowered for supporting the board 31 at any desired angle.

When the board 31 is being used as an easel, it will be noted that it is of less width than the top 11 from side to side, and is arranged so as to leave projecting portions of the top 11 at each side of the board 31, so that drawing instruments, colors, paints or other articles may be placed on the top 11 at either side of the drawing board, where they are convenient of access for use on the drawing board.

By placing a block under the forward edge of the drawing board and then raising it, it may be held in horizontal position, if desired, for providing a supplementary table upon which the pupil can work standing up.

The means for supporting the back end of the drawing board is such that it may be adjusted and the drawing board may be used without interfering with the articles that may be in the trough 13 or on the top 11, except near the forward edge of the top.

The shelf 32 is arranged at the right-hand end of the art desk, so as to be accessible to the right hand of the pupil.

It will be understood that the bottle of india ink may be supported in or on the shelf 32 convenient for making drawings on the board 31.

The arrangement by which the strip 31[a] contacts with the button 23[a], causes the board 31 to assume an inclined position, when swung to its rearward position, and the natural slope of the back of an ordinary chair is thus attained. It will be seen that this inclined back can be adjusted at various heights to accommodate the person using it.

It is my purpose to cover by my claims, any modified forms of art desks, which may come within the reasonable scope of such claims.

I claim as my invention:

1. An art work desk including a top, an adjustable member slidably connected to the desk, a drafting board, and means connecting the drafting board to the adjustable member for swinging movement whereby it may be swung to hang down in a substantially vertical position at the rear of the desk to clear the top or can be swung forwardly to overlie the top.

2. An art work desk comprising a top, an upright member slidably mounted at the back of said desk entirely clear of the top surface of the top, means for locking said upright member in different positions of its vertical sliding movement, a cross bar at the upper end of said upright member, a drawing board, and means for hingedly connecting the drawing board to said cross bar whereby said drawing board may be swung downwardly behind the desk into a substantially vertical position or may be swung over to inclined position with its forward part supported by the forward part of the top.

3. An art work desk comprising a top, an upright member slidably mounted at the back of said desk entirely clear of the top surface of the top, means for locking said upright member in different positions of its vertical sliding movement, a cross bar at the upper end of said upright member, a drawing board, and means for hingedly connecting the drawing board to said cross bar whereby said drawing board may swing downwardly behind the desk into a substantially vertical position or may be swung over to inclined position with its forward part supported by the forward part of the top, the drawing board being narrower from side to side than the top and being arranged so as to leave projecting portions of the top on each side of the drawing board.

4. An art work desk comprising a top, an upright member slidably mounted at the back of said desk entirely clear of the top surface of the top, means for locking said upright member in different positions of its vertical, sliding movement, a cross bar at the upper end of said upright member, a drawing board, double acting hinges for pivotally mounting one end of said drawing board on said cross bar, whereby said drawing board may hang downwardly behind the desk or may be swung over to inclined position with its forward part supported by the forward part of the top, the drawing board being narrower from side to side than the top and being arranged so as to leave projecting portions of the top on each side of the drawing board.

5. An art work desk comprising a top, an upright member slidably mounted at the back of said desk entirely clear of the top surface of the top, means for locking said upright member in different positions of its vertical, sliding movement, a cross bar at the upper end of said upright member, a drawing board, double acting hinges for pivotally mounting one edge of said drawing board on said cross bar, whereby said drawing board may hang downwardly behind the desk or may be swung over to inclined position with its forward part supported by the forward part of the top, the drawing board being narrower from side to side than the top and being arranged so as to leave projecting portions of the top on each side of the drawing board, a swinging shelf supported on said desk at the side thereof in a position readily accessible to one working on the drawing board.

6. An art work desk comprising a top, an upright member slidably mounted at the back of said desk entirely clear of the top surface of the top, means for locking said upright member in different positions of its vertical, sliding movement, a cross bar at the upper end of said upright member, a drawing board, double acting hinges for pivotally mounting one edge of said drawing board on said cross bar, whereby said drawing board may hang downwardly behind the desk or may be swung over to inclined position with its forward part supported by the forward part of the top, the drawing board being narrower from side to side than the top and being arranged so as to leave projecting portions of the top on each side of the drawing board, said top having a trough in its rear portion and a back member limiting the downward movement of said cross bar, so that said board will never interfere with or be interfered with by tools or the like in said trough.

7. An art work desk comprising a top and supporting members, an upright member mounted for vertical adjustment at the back of said desk, means for holding the upright member in various positions of its adjustment, a combined drawing board and back element pivoted to said upright to permit said board to be swung to inclined position with one edge resting on the top or to position hanging behind the desk, said board and upright member having coacting parts for causing the board to be somewhat inclined from vertical to form a convenient back rest when in its latter position, and regardless of its vertical adjustment in such position.

R. C. WOOLMAN.